(12) United States Patent
Digmann et al.

(10) Patent No.: US 7,584,517 B2
(45) Date of Patent: Sep. 8, 2009

(54) WEATHER SHIELD FOR UNDERNEATH A DOCK LEVELER

(75) Inventors: Charles J. Digmann, Cuba City, WI (US); Charles J. Ashelin, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 11/557,652

(22) Filed: Nov. 8, 2006

(65) Prior Publication Data

US 2007/0101518 A1     May 10, 2007

Related U.S. Application Data

(62) Division of application No. 11/268,945, filed on Nov. 8, 2005, now Pat. No. 7,146,673.

(51) Int. Cl.
*E01D 1/00* (2006.01)
(52) U.S. Cl. ............................................. 14/71.1
(58) Field of Classification Search ............. 14/69.5, 14/71.1, 71.3
See application file for complete search history.

(56) References Cited

U.S. PATENT DOCUMENTS

| | | | |
|---|---|---|---|
| 2,681,698 A | 6/1954 | Herman et al. |
| 2,904,802 A | 9/1959 | Hartman |
| 2,924,336 A | 2/1960 | Fulton |
| 3,117,332 A | 1/1964 | Kelley et al. |
| 3,137,017 A | 6/1964 | Pfleger et al. |
| 3,255,478 A | 6/1966 | Lambert |
| 3,359,687 A | 12/1967 | Wallace |
| 3,456,274 A | 7/1969 | McGuire |
| 3,500,599 A | 3/1970 | Sciolino |
| 3,528,086 A | 9/1970 | Conger |
| 3,584,324 A | 6/1971 | Merrick |
| 3,641,604 A | 2/1972 | Eggert, Jr. |

(Continued)

FOREIGN PATENT DOCUMENTS

DE     2239483     2/1974

(Continued)

OTHER PUBLICATIONS

Otco, Inc.; *Roller Curtain Lift Guards*; date unknown (discovered circa Nov. 1, 2001); 2 pages.

(Continued)

*Primary Examiner*—Gary S Hartmann
(74) *Attorney, Agent, or Firm*—Hanley, Flight & Zimmerman, LLC

(57) ABSTRACT

A shield system for shielding the area underneath a dock leveler allows a gap to be created either above or below the shield when the deck rises, whereby a shield of a given height dimension can used on dock levelers of various lift heights. In some embodiments, the shield is a pliable curtain that a tensioner holds taut during some operations of the dock leveler, yet the curtain can collapse for below-dock operation. The shield system can be used on horizontally storing dock levelers or vertically storing ones. In some cases, the system includes a pliable web that extends between a front face of the deck and a lip extending from the deck. The web can help seal the area adjacent to a pair of dock bumpers.

5 Claims, 17 Drawing Sheets

U.S. PATENT DOCUMENTS

| | | | |
|---|---|---|---|
| 3,840,930 | A | 10/1974 | Wanddell |
| 4,010,505 | A | 3/1977 | Bouman |
| 4,020,607 | A | 5/1977 | Bjervig |
| 4,075,787 | A | 2/1978 | Krahe |
| 4,110,860 | A | 9/1978 | Neff et al. |
| 4,126,909 | A | 11/1978 | Smith et al. |
| 4,156,989 | A | 6/1979 | Sparrow |
| RE30,254 | E | 4/1980 | Rasmussen |
| 4,286,410 | A | 9/1981 | Hahn |
| 4,293,969 | A | 10/1981 | Frommelt |
| 4,349,992 | A | 9/1982 | Layne |
| 4,420,849 | A | 12/1983 | Alten |
| 4,422,199 | A | 12/1983 | Frommelt |
| 4,557,008 | A | 12/1985 | Jurden |
| 4,560,315 | A | 12/1985 | Hahn |
| 4,682,382 | A | 7/1987 | Bennett |
| 4,776,052 | A | 10/1988 | Delgado et al. |
| 4,799,341 | A | 1/1989 | Frommelt et al. |
| 4,799,342 | A | 1/1989 | Klevnjans |
| 4,928,340 | A | 5/1990 | Alexander |
| 5,001,799 | A | 3/1991 | Alexander et al. |
| 5,042,103 | A | 8/1991 | Megens |
| 5,167,101 | A | 12/1992 | Alten |
| 5,313,681 | A | 5/1994 | Alexander |
| 5,396,676 | A | 3/1995 | Alexander et al. |
| 5,442,825 | A | 8/1995 | Hahn et al. |
| 5,542,463 | A | 8/1996 | Pinkalla et al. |
| 5,702,223 | A | 12/1997 | Hahn et al. |
| 6,098,227 | A * | 8/2000 | Meichtry et al. .............. 14/69.5 |
| 6,106,212 | A | 8/2000 | Hahn |
| 6,145,571 | A | 11/2000 | Snyder |
| 6,205,606 | B1 | 3/2001 | Zibella et al. |
| 6,240,587 | B1 | 6/2001 | Meichtry et al. |
| 6,272,799 | B1 | 8/2001 | Ashelin et al. |
| 6,502,268 | B2 | 1/2003 | Ashelin et al. |
| 6,654,976 | B2 | 12/2003 | Digmann et al. |
| 7,146,673 | B1 * | 12/2006 | Digmann et al. .............. 14/71.5 |
| 7,334,281 | B2 * | 2/2008 | Digmann et al. .............. 14/71.1 |
| 2002/0152562 | A1 | 10/2002 | Ashelin |
| 2003/0005530 | A1 | 1/2003 | Digmann |
| 2007/0101517 | A1 * | 5/2007 | Digmann et al. .............. 14/71.1 |

FOREIGN PATENT DOCUMENTS

| | | |
|---|---|---|
| EP | 1445222 | 8/2004 |
| NL | 7707810 | 1/1979 |

OTHER PUBLICATIONS

Blueprint Nos. 692-0125 and 692-0126; *VHL Bottom Pads and VHL Bottom Pads Detail*; Frommelt Industries, Inc. dated Oct. 7, 1988.

Frommelt Products Corporation; *Drawing No. D 692 0323 of ESPN Installation*; sold and installed in the US on Oct. 30, 1996; 4 pages.

Patent Cooperation Treaty, "International Search Report" PCT/US/2006/060650, date of mailing: Mar. 16, 2007, 4 pages.

Patent Cooperation Treaty, "Written Opinion of the International Searching Authority" for PCT/US2006/060650, date of mailing: Mar. 16, 2007, 5 pages.

The European Patent Office, "European Patent Office Action," issued in connection with European patent application 06 839 763.7, mailed Feb. 12, 2009, 3 pages.

* cited by examiner

WEATHER SHIELD FOR UNDERNEATH A DOCK LEVELER

CROSS REFERENCE TO RELATED APPLICATION

This application is a divisional of U.S. patent application Ser. No. 11/268,945, filed Nov. 8, 2005, now U.S. Pat. No. 7,146,673, entitled "Weather Shield for Underneath a Dock Leveler," and incorporated herein by reference in its entirety.

FIELD OF DISCLOSURE

The subject disclosure generally pertains to loading docks and more specifically to a shield system for sheltering an area underneath a dock leveler.

BACKGROUND

A typical loading dock of a building includes an exterior doorway with an elevated platform for loading and unloading vehicles, such as trucks and trailers. To compensate for height differences between the loading dock platform and an adjacent bed of a truck or trailer, many loading docks have a dock leveler. A typical dock leveler includes a deck or ramp that is pivotally hinged along its back edge to vary the height of its front edge. An extension plate or lip extends outward from the deck's front edge to span the gap between the rear of the truck bed and the front edge of the deck.

The deck and lip are usually moveable between a stored position and an operative position. When in the stored position, the deck may be either vertical or horizontal, depending on the style of dock leveler. U.S. Pat. No. 6,502,268 shows an example of a horizontally storing deck, and U.S. Pat. No. 5,396,676 discloses a dock leveler with a vertically storing deck. In either case, the lip in the operative position extends from the deck's front edge and rests upon the truck bed to form a bridge between the two. This allows personnel and material handling equipment to readily move on and off the vehicle during loading and unloading operations.

To help shield against weather while a vehicle is being serviced at the dock, some type of seal is usually installed around the perimeter of the doorway. Such seals are typically installed along the upper and side edges of the doorway to help seal any air gaps that may otherwise exist between the face of the building and the rear of the vehicle. The dock leveler lip resting upon the rear of the vehicle is often relied upon to seal most of the doorway's lower edge.

The area or pit underneath a dock leveler's deck, however, is usually exposed to outside air. This can create problems, particularly when there is a significant temperature differential between the indoor and outdoor air. Warm outside air, for example, may condense underneath a relatively cool deck of a dock leveler used in a cold storage warehouse. The condensation can promote corrosion of various parts of the dock leveler. Conversely, a heated building during the winter may loose a significant amount of heat by thermal conduction through the deck, as cold outside air cools the ramp from underneath. Thus, regardless of whether the outside air is colder or warmer than the inside air, it may be beneficial to shield the underside of a dock leveler from outside air, as proposed in U.S. Pat. No. 4,682,382 and the abovementioned '268 and '676 patents. These patented shields, however, have their limitations.

The '382 patent suggests using a rectangular panel to help shield the area underneath a dock leveler. A lower edge of the panel is coupled to the dock, while the panel's upper edge has a resilient sealing strip for sealing against the rear of a vehicle. The effectiveness of that seal, however, may depend on how squarely a vehicle backs into the dock and may further depend on the shape or contour of the vehicle's rear surface. Moreover, in the absence of a vehicle, it appears that the dock leveler lip, rather than the rectangular panel, is relied upon to shield the underside of the ramp from the outside air. Also, to move the lip from a stored, pendant position to an extended, operative position, the ramp apparently must lift the lip up and over the upper edge of the panel before the lip can be set back down atop the truck bed. As the lip travels over the top of the sealing strip, the underside of the ramp may be momentarily exposed to an inrush of outside air.

The '268 patent discloses a shield that is connected to both the underside of the deck and the foundation surrounding the pit. Although such a design works well for new dock leveler installations, such a shield can be difficult to custom fit to an already-existing dock leveler. The shield, for instance, may need to be sized for the deck's degree of opening and may need special cutouts to accommodate various components and operating mechanisms of the dock leveler.

The '676 patent discloses a shield that flexes inward or farther underneath the deck as the deck descends. Since dock levelers typically have a lip actuator and/or other operating mechanisms near the front edge of the deck, a shield flexing inward may interfere with such mechanisms. Moreover, the '676, '268, and '382 patents fail to disclose an effective way of sealing the area between the underside of an extended lip and adjacent dock bumpers, which are often installed at the dock to establish a predetermined minimum distance between the rear edge of a truck and the face of the building or front edge of the dock leveler.

Consequently, a need exists for an under leveler seal system that overcomes the limitations of current systems.

SUMMARY

In some embodiments, a shield system includes a curtain that can be maintained in vertical tension without the curtain having to span the entire vertical gap between a fully raised deck and the pit.

In some embodiments, the curtain is attached to the deck and can lift away from the pit.

In some embodiments, the curtain is attached to the pit and the deck can lift away from the curtain.

In some embodiments, the curtain is held in tension by way of a tensioner that is attached to the deck.

In some embodiments, the curtain is held in tension by way of a tensioner that is coupled to the pit.

In some embodiments, the tensioner includes a spring.

In some embodiments, the tensioner includes a pliable elongate member, such as a cable, strap, cord, chain, or the like.

In some embodiments, the tensioner includes a wheel such as a pulley, sheave or the like.

In some embodiments, a seal system includes a flexible web suspended from a lip of a dock leveler, wherein the web can seal against a front edge of the deck and/or the side a dock bumper.

In some embodiments, a seal system includes a curtain supported by the toe guards of a dock leveler.

In some embodiments, the sealing curtain is closer to the upper end of the toe guard than the lower end so that curtain can remain generally planar.

In some embodiments, the sealing curtain and the toe guard can both collapse to facilitate below-dock end loading.

In some embodiments, a collapsible sealing member is supported in a generally fixed orientation relative to the deck, so that as the deck pivots the seal avoids interfering with operating mechanisms underneath the deck.

DETAILED DESCRIPTION

Figure 1:
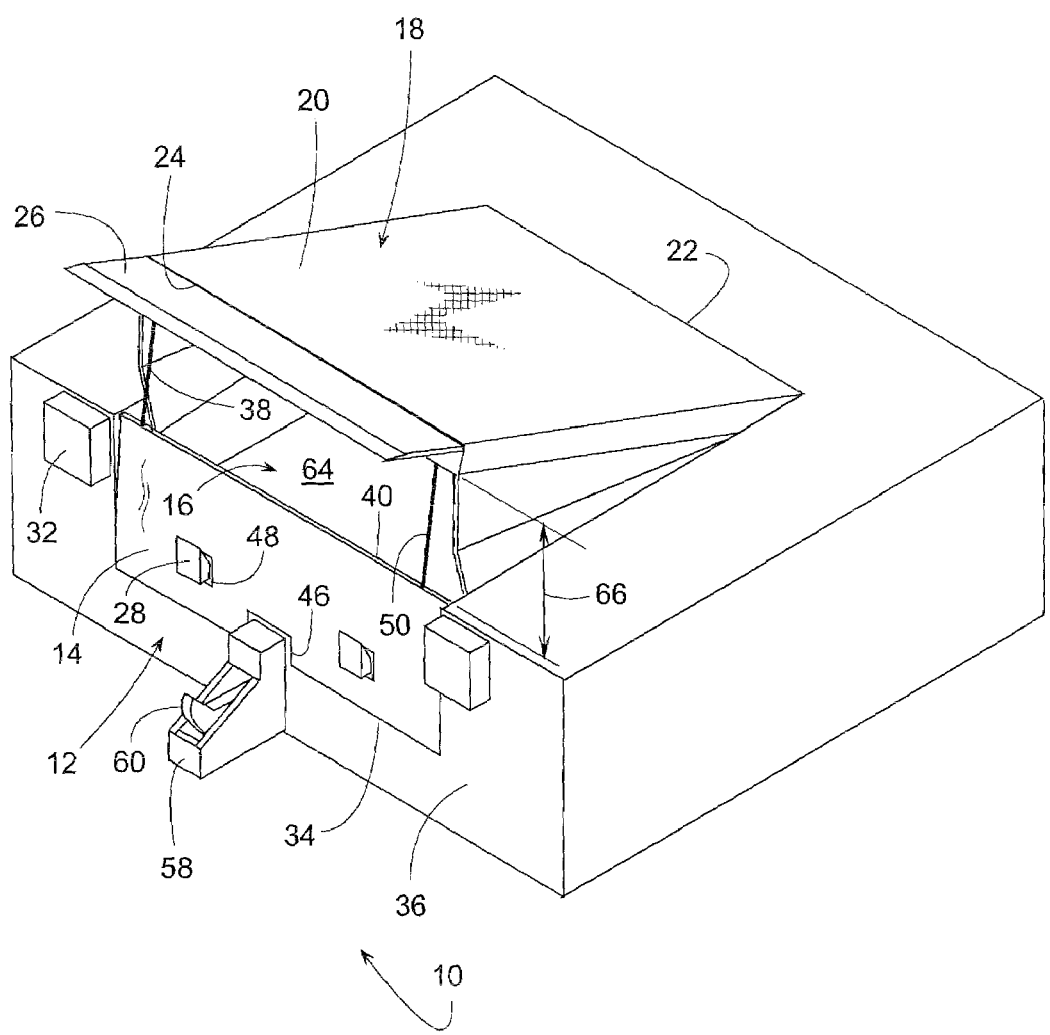
FIG. 1 is a perspective view of a loading dock with shield system for shielding the area underneath a dock leveler.

FIGS. 1-5 show a loading dock 10 with a shield system 12 that includes a pliable curtain 14 for shielding a pit area 16 underneath a dock leveler 18. By blocking out weather and other elements, curtain 14 helps protect pit area 16. By using a pliable curtain rather than a thicker, more rigid structure, shield system 12, and alternate embodiments thereof, can be readily adapted to fit a wide variety of dock levelers and pits. A curtain, for instance, can be custom cut to size at the installation site, and various cutouts can be made so that the curtain does not to interfere with the operation of the dock leveler.

Such trimming is not readily accomplished with thicker foam seals, especially if they are encased within a fabric covering. Moreover, a thick foam seal takes up more space underneath a dock leveler than does a relatively thin curtain.

A pliable curtain, however, is not self-supporting, so shield system 12 and various other embodiments herein include some sort of tensioner or supporting structure that helps support the curtain. Although such supporting structure consumes additional space, the supporting structure can be installed wherever it is most convenient.

With the versatility of curtain 14 and its supporting structure, shield system 12 can be applied to a wide variety of dock levelers, such as those whose structure and operation are described in U.S. Pat. Nos. 6,502,268; 3,137,017; 4,293,969, 5,396,676; 4,776,052; and 6,205,606; all of which are specifically incorporated by reference herein.

Figure 2:
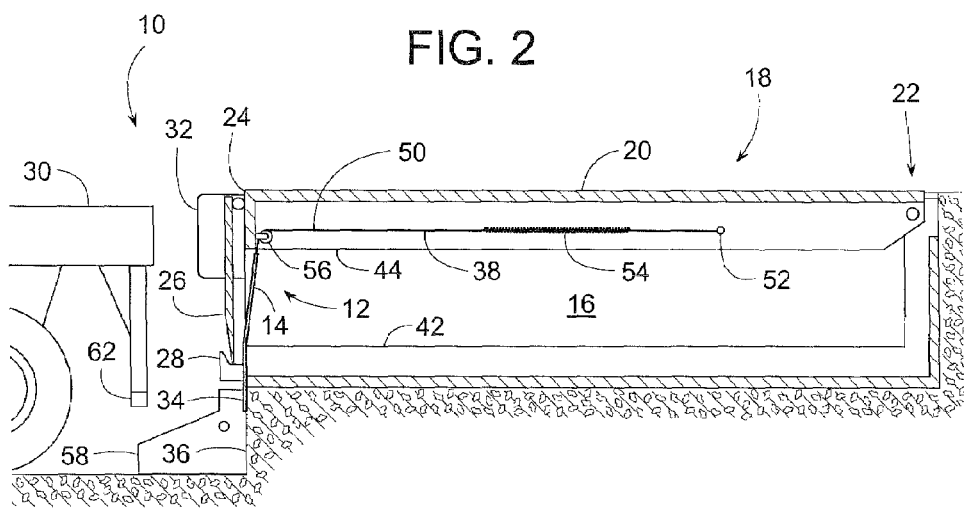
FIG. 2 is a side view of the shield system of FIG. 1, wherein the dock leveler is at a stored position.
Figure 11:
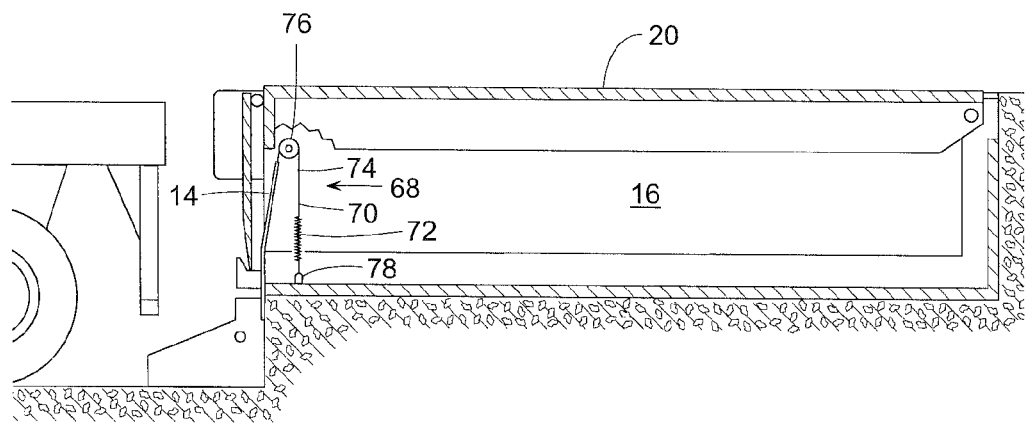
FIG. 11 is similar to FIG. 2 but showing another embodiment of a shield system.
Figure 12:
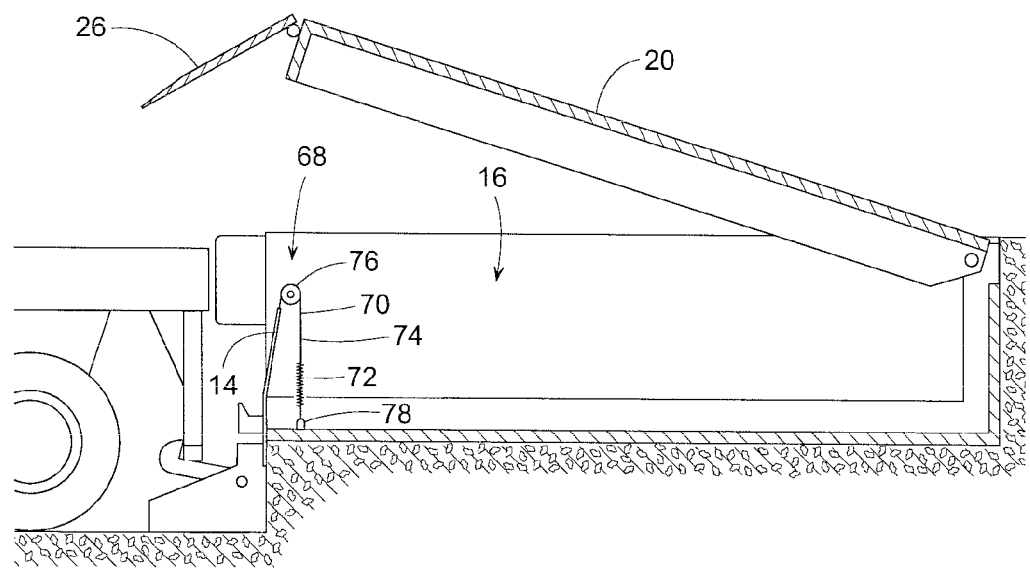
FIG. 12 is similar to FIG. 3 but showing the embodiment of FIG. 11.
Figure 13:
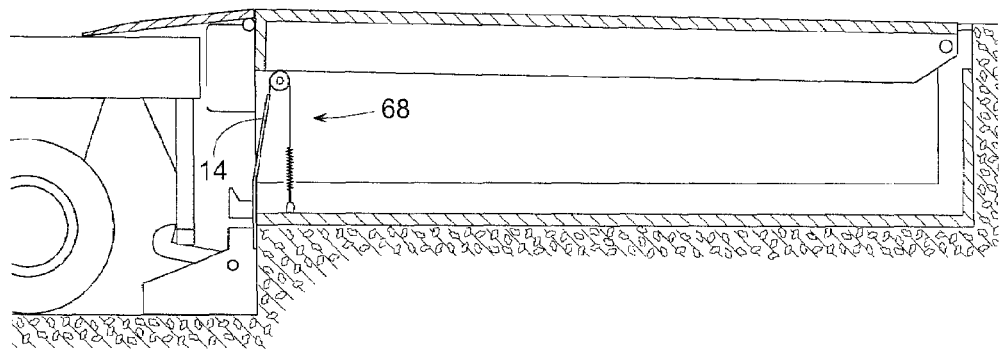
FIG. 13 is similar to FIG. 4 but showing the embodiment of FIG. 11.
Figure 15:
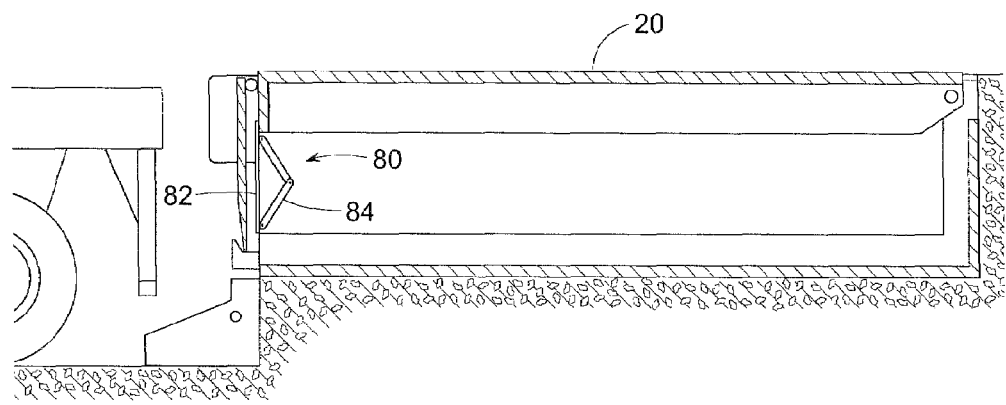
FIG. 15 is similar to FIG. 2 but showing another embodiment of a shield system.
Figure 16:
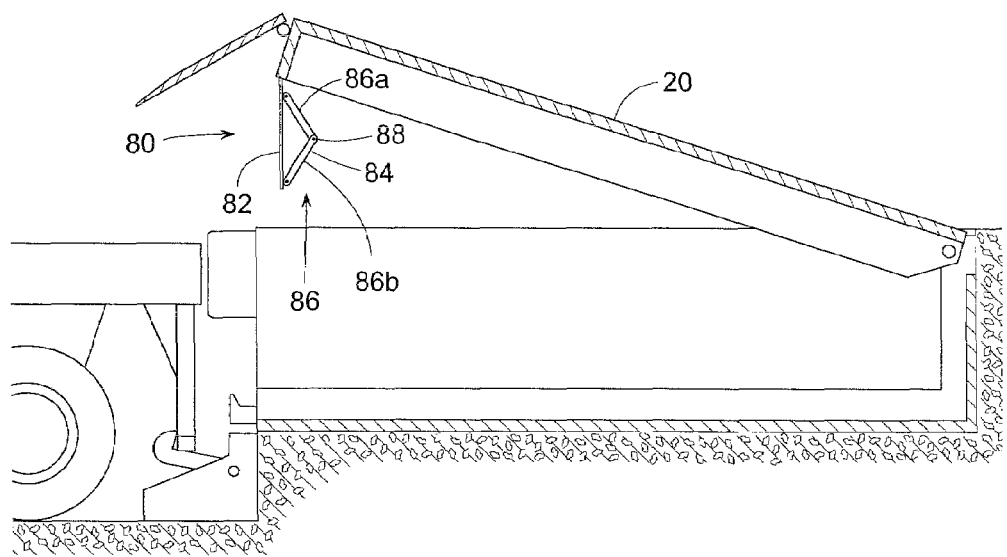
FIG. 16 is similar to FIG. 3 but showing the embodiment of FIG. 15.
Figure 17:
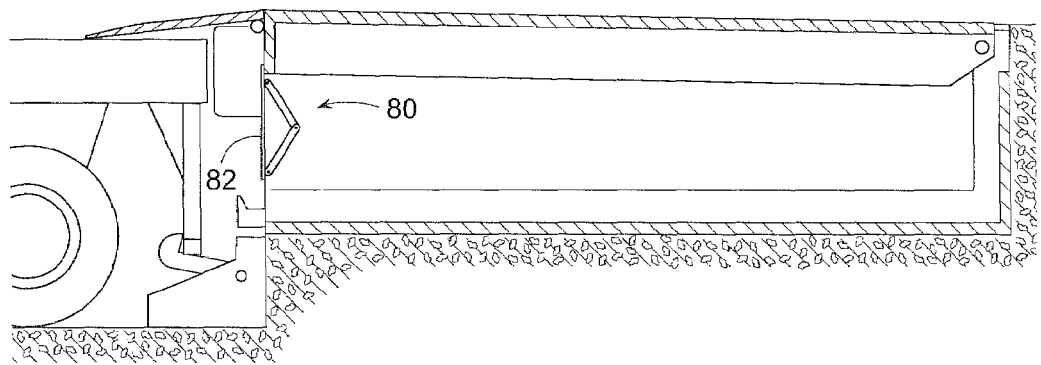
FIG. 17 is similar to FIG. 4 but showing the embodiment of FIG. 15.
Figure 19:
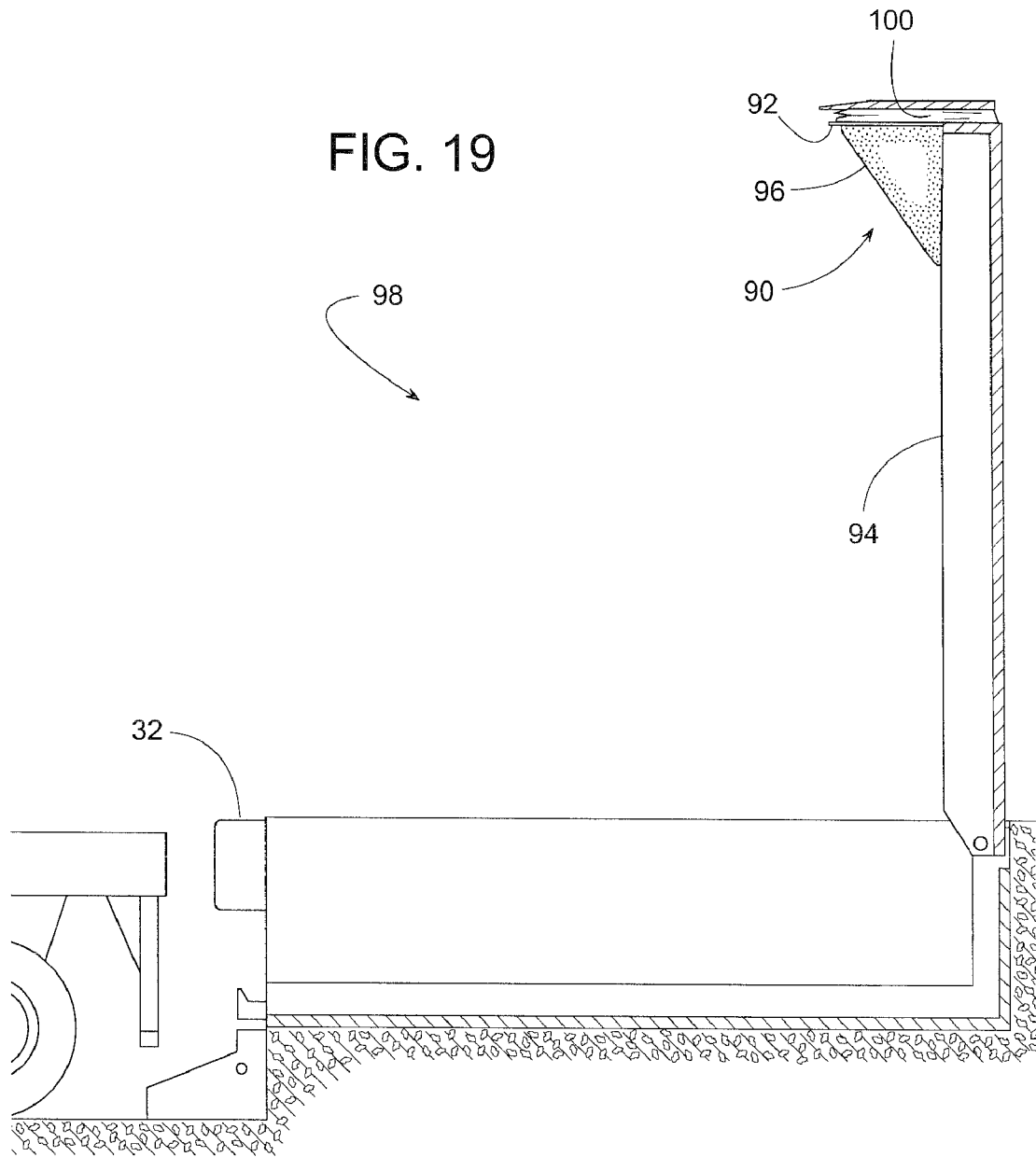
FIG. 19 is similar to FIG. 2 but showing another embodiment of a shield system.
Figure 23:
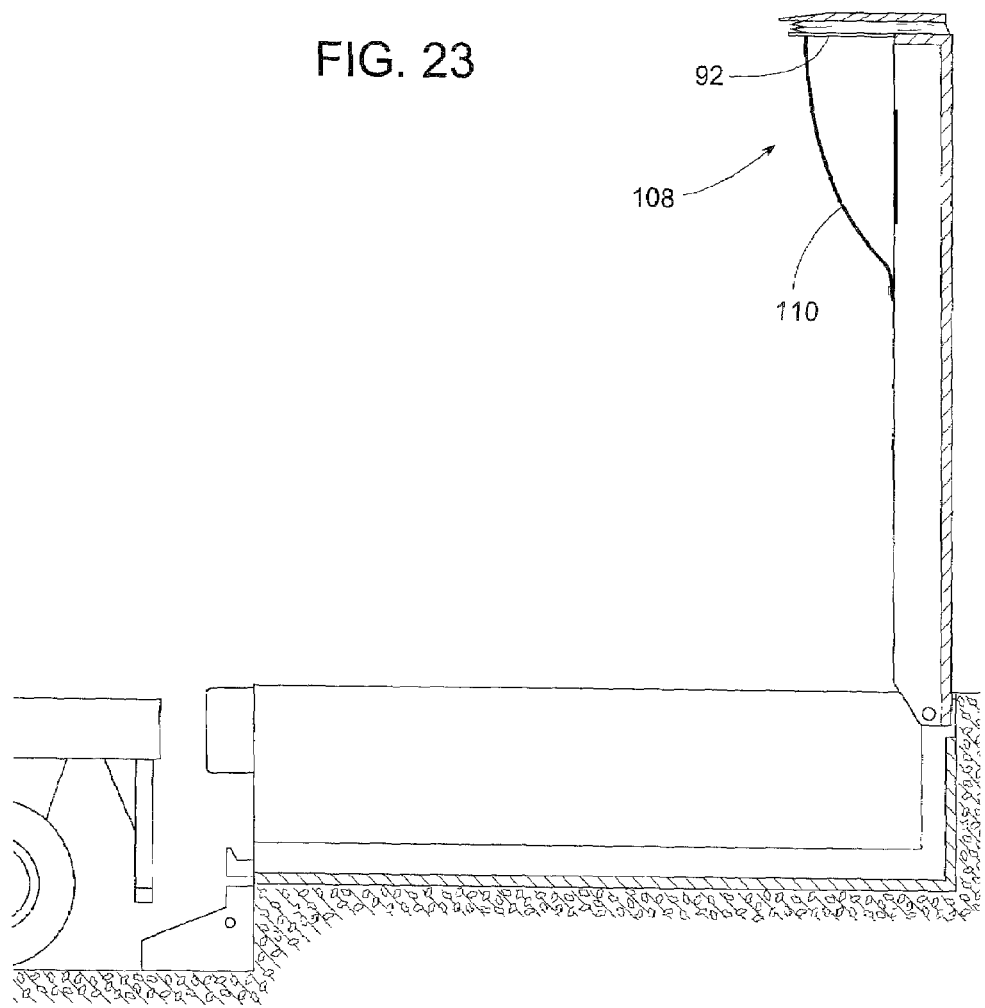
FIG. 23 is similar to FIG. 2 but showing another embodiment of a shield system.
Figure 24:
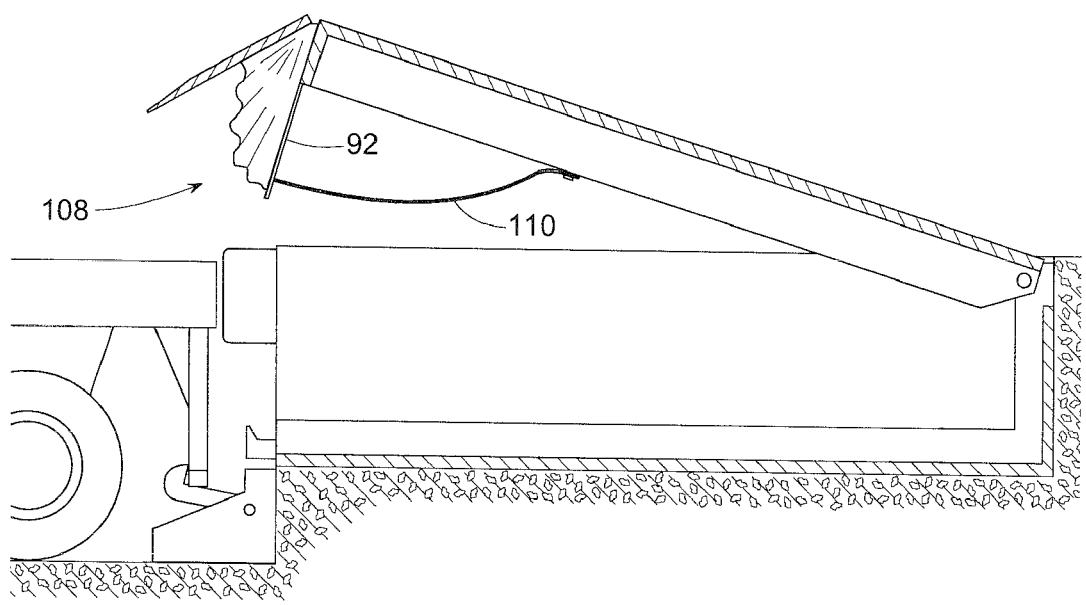
FIG. 24 is similar to FIG. 3 but showing the embodiment of FIG. 23.
Figure 25:
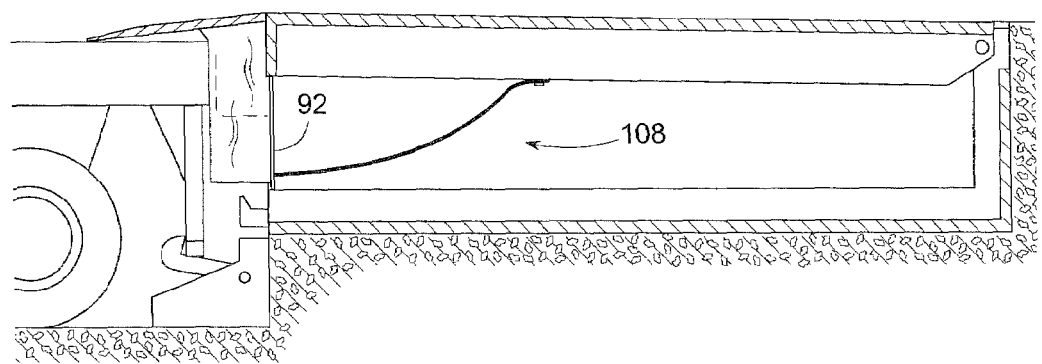
FIG. 25 is similar to FIG. 4 but showing the embodiment of FIG. 23.
Figure 26:
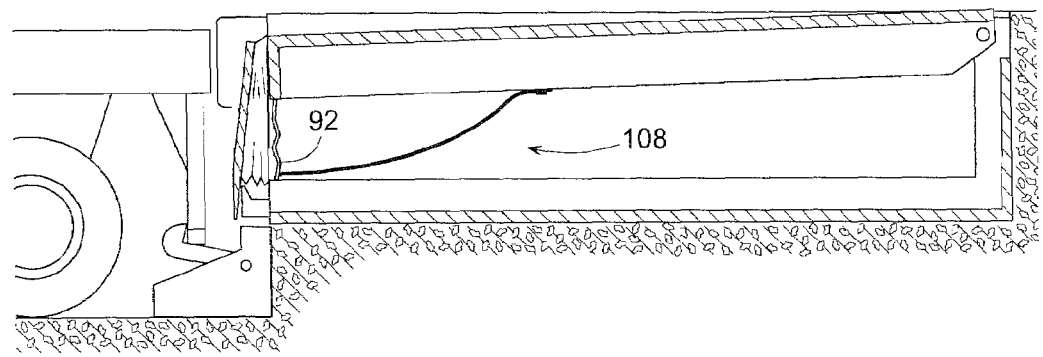
FIG. 26 is similar to FIG. 5 but showing the embodiment of FIG. 23.

For example, dock lever 18 may include a deck 20 that can pivot about its rear edge 22 to raise and lower its front edge 24. A lip 26 can be pivotally attached to front edge 24, as explained in the "Background." The deck of some dock levelers store horizontally, as shown in FIGS. 2, 11 and 15 and disclosed in U.S. Pat. Nos. 6,502,268; 3,137,017; and 4,293, 969. Other decks store vertically, as shown in FIGS. 19 and 23 and disclosed in U.S. Pat. Nos. 5,396,676; 4,776,052; and 6,205,606. The mechanisms for pivoting deck 20 and lip 26 have not been shown so as to not interfere with the illustration of other features of the dock leveler 18. However, such mechanisms are well known in the industry.

The operating sequence of dock leveler 18 and shield system 12 may begin with deck 20 in its stored, cross-traffic position, as shown in FIG. 2. In this position, lip 26 may be supported by a set of lip keepers 28 so that lip 26 and keepers 28 can help hold deck 20 in its generally horizontal position. With dock leveler 18 in its stored position, a vehicle 30, such as a truck, trailer, or the like, can back into dock 10 until the rear end of vehicle 30 engages or is adjacent to a set of bumpers 32.

To help shield pit area 16, curtain 14 has a lower edge 34 attached to the loading dock's front face 36, just below pit 16. A tensioner 38 attached to an upper edge 40 of curtain 14 applies vertical tension to curtain 14. The tension helps keep curtain 14 generally upright in front of pit area 16, i.e., between an upper surface 42 of pit 16 and a lower surface 44 of deck 20. Curtain 14 can be made of any pliable or semi-flexible material including, but not limited to, nylon, canvas, HYPALON (Dupont trademark), canvas duck, rubber impregnated fabric, foam, etc. Curtain 14 may include various notches 46 or cutouts 48 to accommodate lip keepers 28, vehicle restraints, or other components.

Tensioner 38 represents any structure that can create vertical tension in curtain 14. In one example, tensioner 38 comprises one or more pliable elongate members 50 (e.g., cable, strap, chain, cord, etc.) extending between the curtain's upper edge 40 and an anchor point 52 on deck 20. In some embodiments, a spring 54 (e.g., helical spring, elastic cord, gas spring, etc.) coupled to member 38 can be used to maintain tension in member 38 as deck 20 pivots up and down, and a wheel 56 (e.g., pulley, sheave, etc.) allows the tension to be applied to curtain 14 in a generally vertical direction. In other embodiments, a deadweight or counterbalance can be used for creating the vertical tension in curtain 14.

After vehicle 30 engages or is sufficiently close to bumpers 32, a vehicle restraint 58 may raise its barrier 60 to engage the vehicle's ICC bar 62, thereby helping hold vehicle 30 in position. The use of a vehicle restraint to engage a vehicle's ICC bar is well known in the industry and is disclosed in U.S. Pat. Nos. 4,560,315; 5,702,223; and 6,106,212; all of which are specifically incorporated by reference herein.

Figure 3:
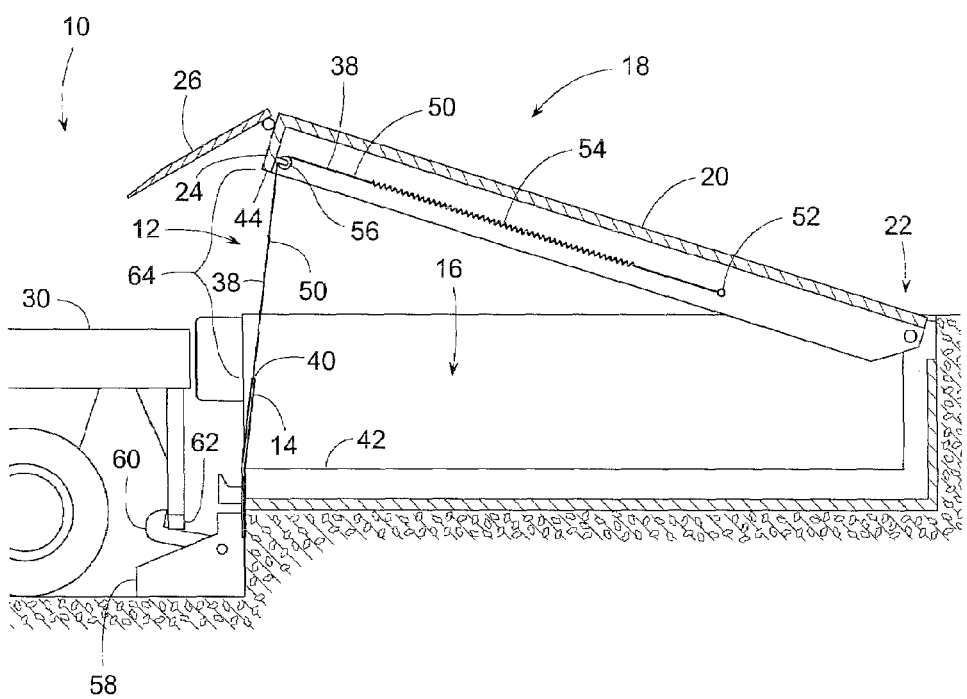
FIG. 3 is side view similar to FIG. 2 but with the deck raised and the lip partially extended.
Figure 4:
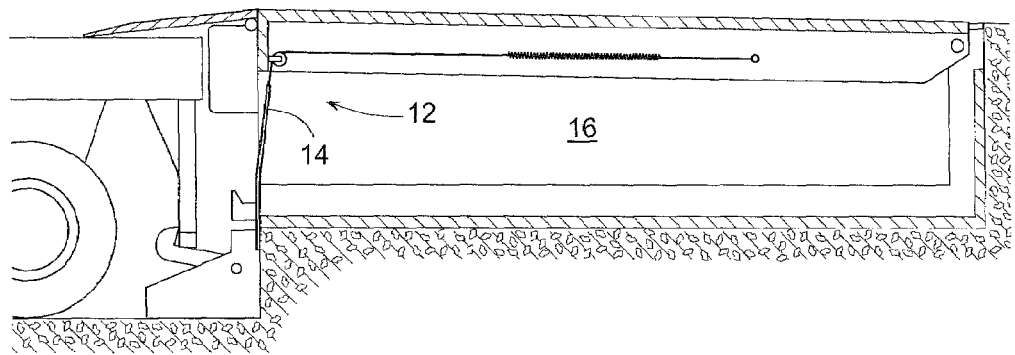
FIG. 4 is a side view similar to FIG. 2 but with the lip resting on the truck bed.

Once vehicle 30 is in the position shown in FIG. 3, deck 20 rises so that lip 26 can be extended and subsequently lowered back down to rest upon the vehicle's truck bed, as shown in FIG. 4. When deck 20 is raised, as shown in FIGS. 1 and 3, upper edge 40 of curtain 14 and lower surface 44 of deck 20 define a gap 64 therebetween. Gap 64 has a height 66 that varies with the pivotal movement of deck 20. Being able to create gap 64 while still maintaining tension in curtain 14 allows a curtain of a given height to fit various dock levelers even though their decks may rise to different levels. Moreover, being able to create gap 64 means that curtain 14 does not have to extend fully up to the maximum lift height of deck 20, thus curtain 14 can be shorter than if upper edge 40 were directly attached to deck 20.

In comparing FIGS. 2 and 3, it should be noted that as deck 20 rises, spring 54 stretches to accommodate the increased distance between wheel 56 and the curtain's upper edge 40.

With dock leveler 18 in the position of FIG. 4, vehicle 30 can be loaded and unloaded of its cargo while curtain 14 provides an effective barrier that helps keep pit area 16 clean and dry, as the height of gap 64 is now minimal or nonexistent.

Figure 5:
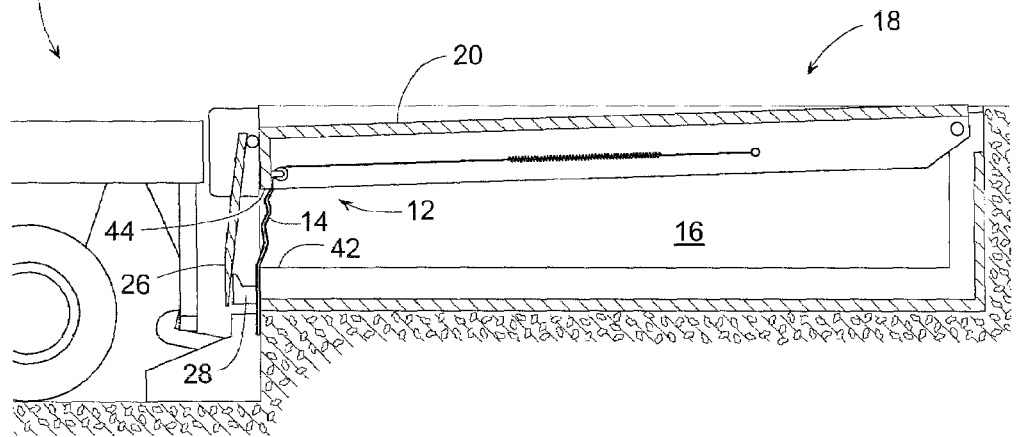
FIG. 5 is a side view similar to FIG. 2 but with the dock leveler in a below-dock position.
Figure 6:
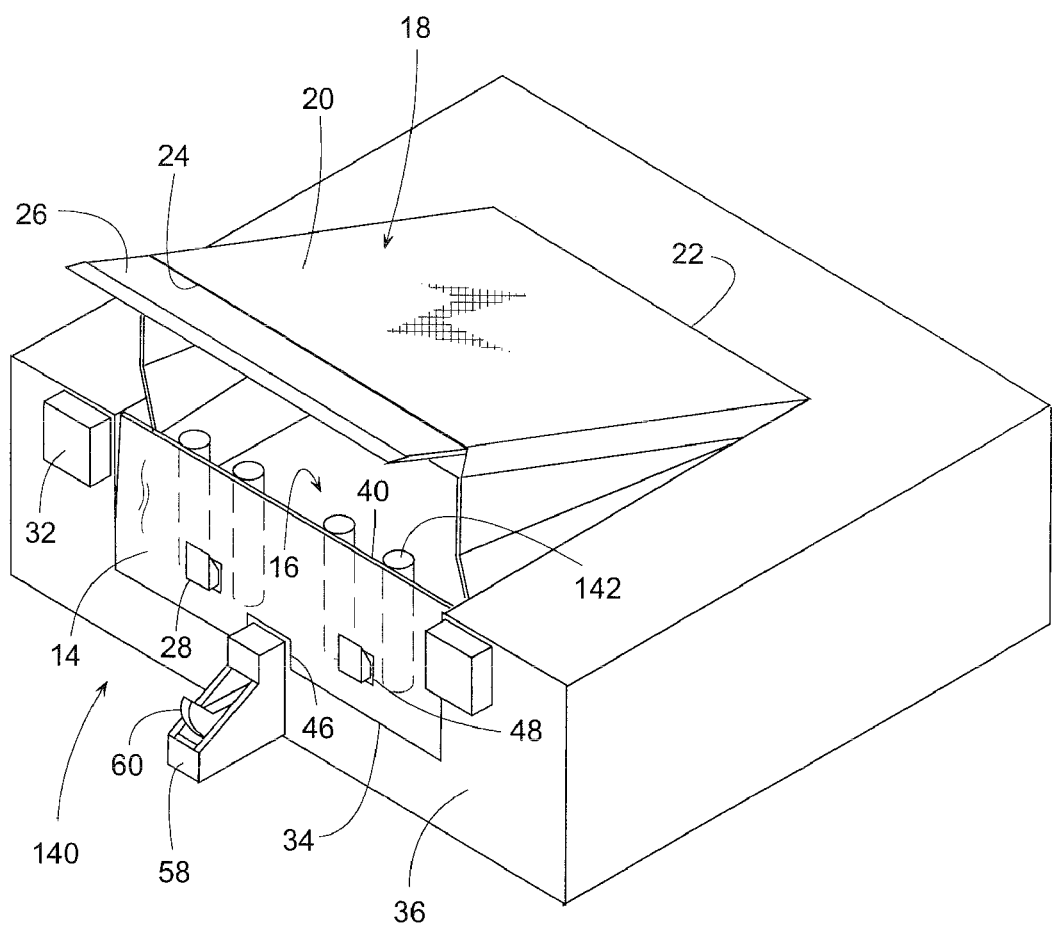
FIG. 6 is similar to FIG. 1 but showing another embodiment of a shield.

For end-loading or other below-dock operations, dock leveler 18 can be positioned as shown in FIG. 5. In this position, deck 20 lowers lip 26 below its lip keepers 28. Even though the vertical distance between the deck's lower surface 44 and the upper surface 42 of pit 16 is less than the full height of curtain 14, below-dock operation is still possible due to the flexibility of curtain 14, which allows curtain 14 to collapse under pressure from deck 20.

FIGS. 6-10 illustrate an alternate shield system 140 where pliable curtain 14 is supported by a collapsible supporting structure 142. With this design, curtain 14 can be trimmed at the installation site to fit any pit, dock leveler and associated hardware. Once cut to size, any number of supporting structures 142 can be mounted to the pit floor or other anchor point and attached to curtain 14 at any suitable location that does not interfere with the operation of dock leveler 18. Structures 142 can be fastened to curtain 14 by any suitable means including, but not limited to, threaded fasteners, VELCRO, adhesive, straps, rope, and clamps. Structure 142 is schematically illustrated to represent any body that can be collapsed under pressure and later resiliently recover its original shape. Examples of structure 142 include, but are not limited to, a foam block or column, a helical or leaf spring, a telescoping member (e.g., piston/cylinder, air spring, shock absorber, etc.), rubber or other polymeric rod, and various combinations thereof. In some cases, structure 142 may be encased within a protective fabric jacket.

Figure 7:
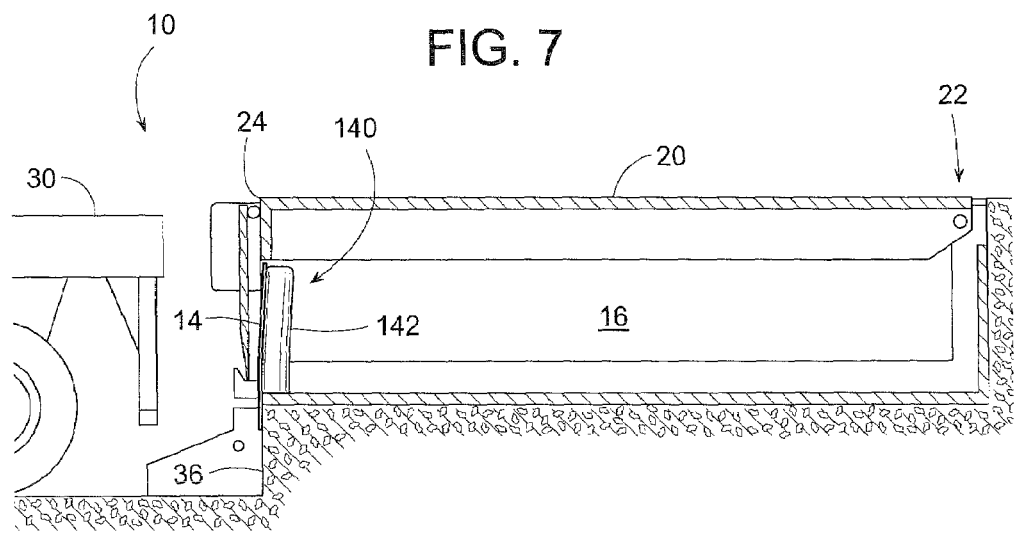
FIG. 7 is similar to FIG. 2 but showing the embodiment of FIG. 6.
Figure 8:
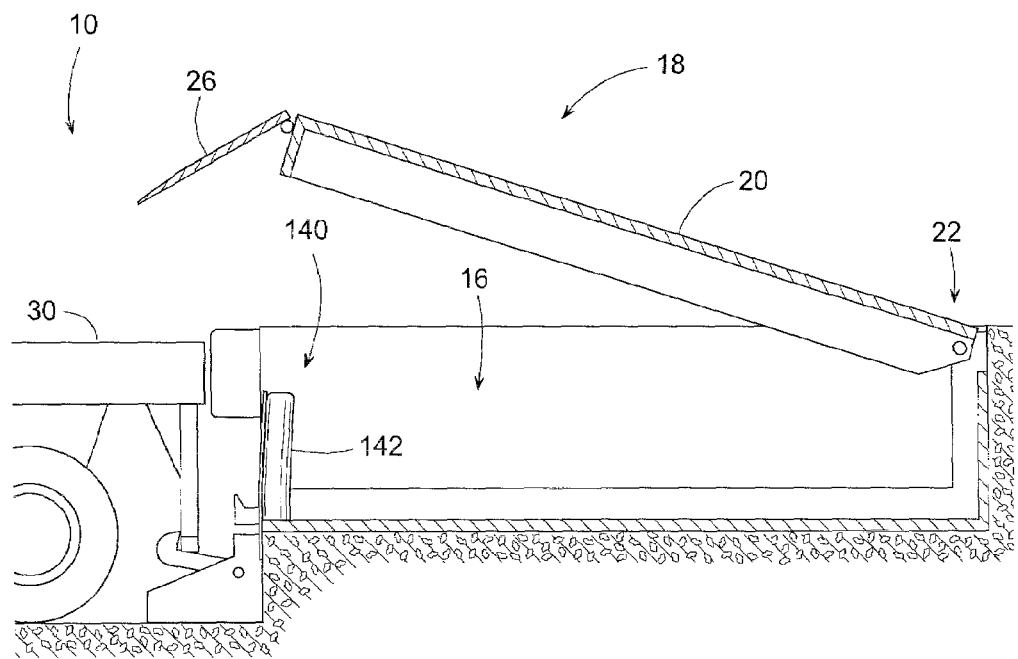
FIG. 8 is similar to FIG. 3 but showing the embodiment of FIG. 6.
Figure 9:
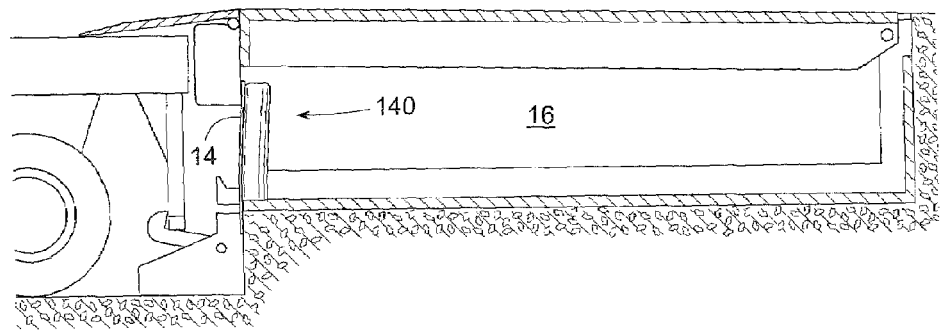
FIG. 9 is similar to FIG. 4 but showing the embodiment of FIG. 6.
Figure 10:
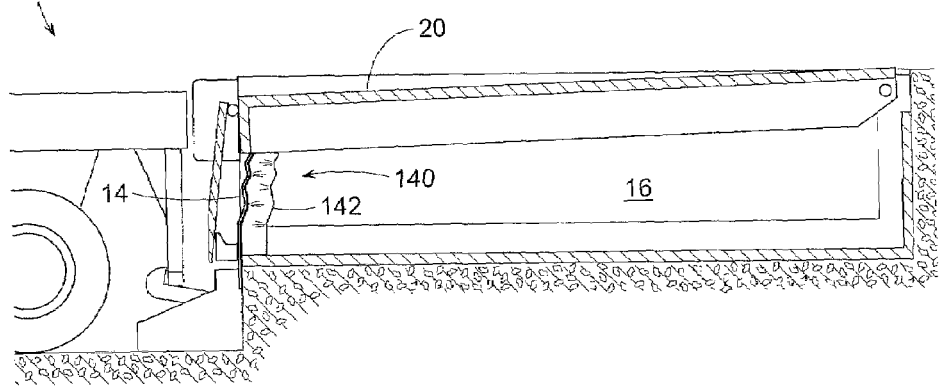
FIG. 10 is similar to FIG. 5 but showing the embodiment of FIG. 6.

The operation of shield system 140 is comparable to that of system 12 with FIGS. 6, 7, 8, 9 and 10 corresponding to FIGS. 1, 2, 3, 4 and 5 respectively. When deck 20 is in a cross-traffic position, as shown in FIG. 7, the upper edge of curtain 14 and supporting structure 142 is adjacent to the lower surface of deck 20. Supporting structure 142 holds curtain 14 relatively taut in front of pit 16 so that system 140 can effectively shelter the area under deck 20. Since deck 20 is not attached to system 140, deck 20 is free to pivot to a raised position, as shown in FIG. 8. The collapsibility of curtain 14 and structure 142 allows deck 20 to descend to a below-dock position, as shown in FIG. 10.

Figure 14:
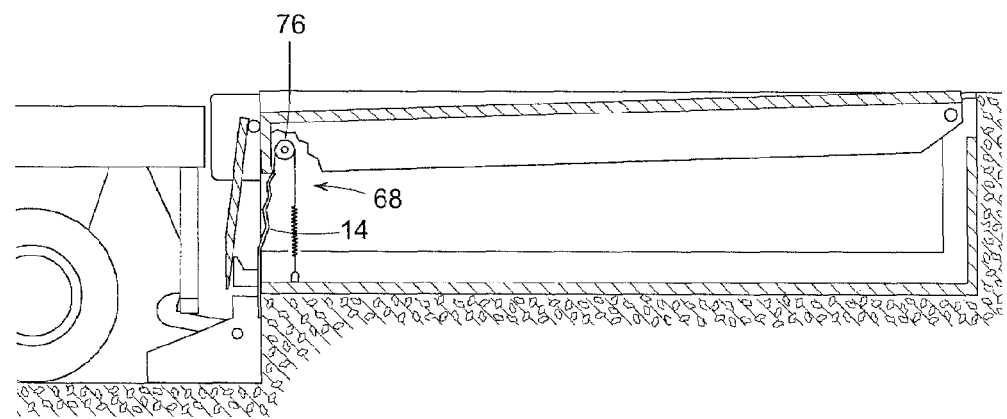
FIG. 14 is similar to FIG. 5 but showing the embodiment of FIG. 11.

FIGS. 11-14 illustrate an alternate shield system 68 that includes curtain 14. Shield system 68 is similar to system 12 with FIGS. 11, 12, 13 and 14 corresponding to FIGS. 2, 3, 4 and 5 respectively. Shield system 68 has a curtain tensioner 70 comprising a spring 72, an elongate member 74, and a wheel 76 that are similar to corresponding items of tensioner 12. However, wheel 76 and an anchor point 78 can be attached to any convenient point of the loading dock rather than having to be attached to deck 20. Wheel 76, for instance, could be attached to a sidewall of pit 16, and anchor point 78 could be attached to the floor of the pit. By allowing the separation of tensioner 70 and deck 20, tensioner 70 can be shorter because the tensioner 70 does not have to span the maximum lift distance of the deck 20. The flexibility of curtain 14 still allows below-dock operation as shown in FIG. 14. Although curtain tensioner 70 comprises spring 72, elongate member 74 and wheel 76 to apply vertical tension in curtain 14, a wide variety of other spring loaded mechanisms mounted within pit 16 and separated from deck 20 could be used for holding curtain 14 taut.

Figure 18:
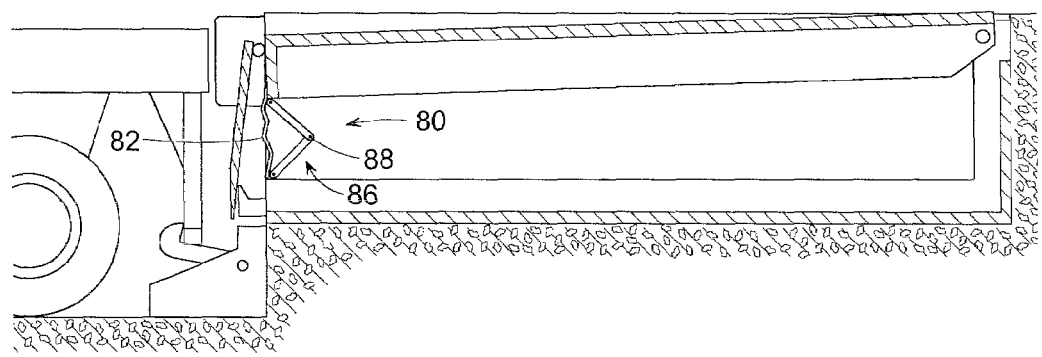
FIG. 18 is similar to FIG. 5 but showing the embodiment of FIG. 15.

In another embodiment, shown in FIGS. 15-18, a shield system 80 includes a flexible curtain 82 suspended from deck 20. Curtain 82 is held vertically taut by way of a tensioner 84 that includes two spring-loaded arms 86, an upper arm 86a and a lower arm 86b. Each arm 86a and 86b has a distal end attached to curtain 82, and the two arms are joined at a central pivot point 88. A torsion spring can be used to urge the distal ends of arms 86a and 86b apart so that they impart vertical tension in curtain 82. FIGS. 15, 16, 17 and 18 correspond to FIGS. 2, 3, 4 and 5 respectively. The flexibility of curtain 82 and arms 86 being able to pivot about point 88 under the urging of the torsion spring allow below-dock operation as shown in FIG. 18.

Figure 20:
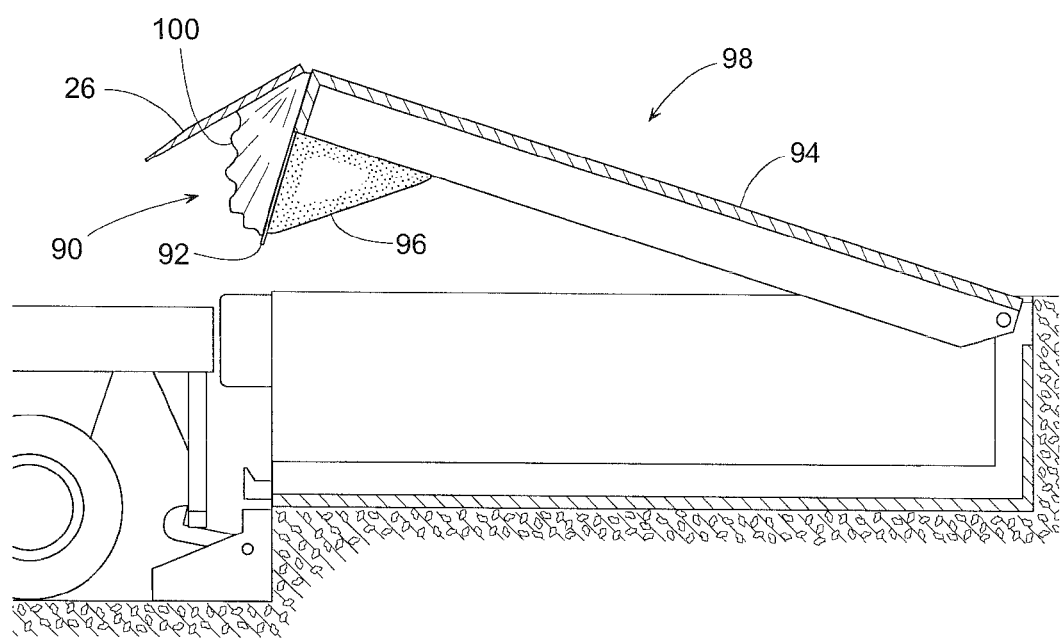
FIG. 20 is similar to FIG. 3 but showing the embodiment of FIG. 19.
Figure 21:
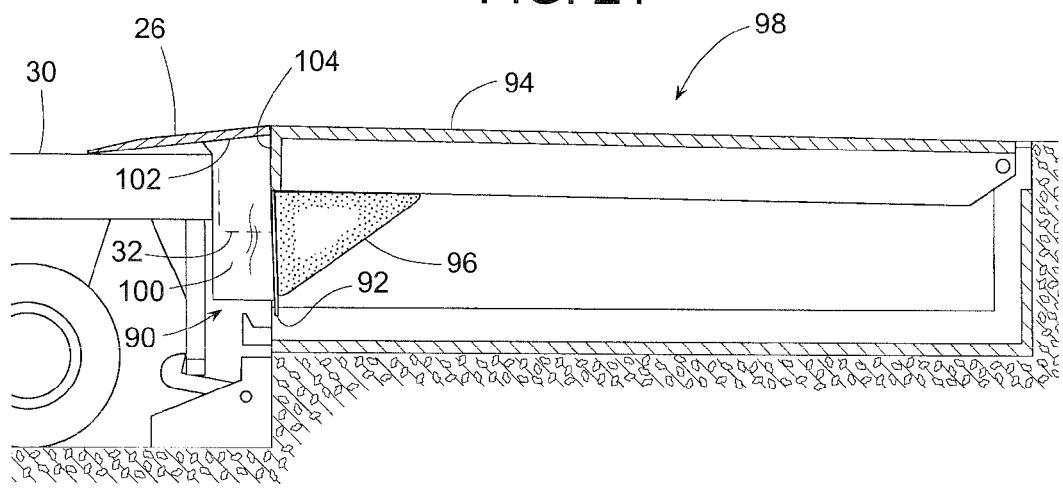
FIG. 21 is similar to FIG. 4 but showing the embodiment of FIG. 19.
Figure 22:
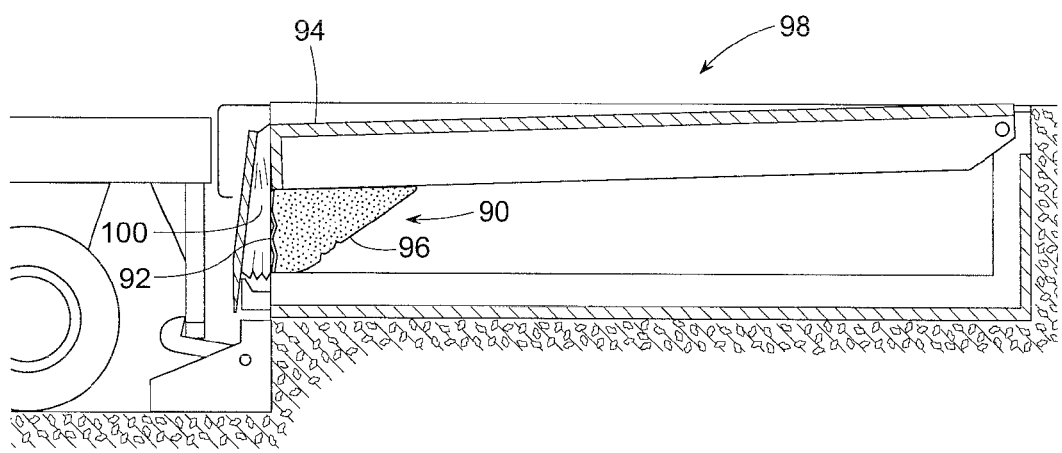
FIG. 22 is similar to FIG. 5 but showing the embodiment of FIG. 19.

In another embodiment, shown in FIGS. 19-22, a shield system 90 includes a flexible curtain 92 suspended from a vertically storing pivotal deck 94 and supported by one or more foam blocks 96. FIGS. 19, 20, 21 and 22 correspond to FIGS. 2, 3, 4 and 5 respectively. Although shield system 90 is shown mounted to a vertically storing dock leveler 98, system 90 could also be installed on horizontally storing dock levelers, such as dock leveler 18. In FIGS. 19-21, foam block 96 helps keep curtain 92 in a generally fixed orientation relative to deck 94. In FIG. 22, however, the flexibility of curtain 92 and foam block 96 allow below-dock operation.

Figure 27:
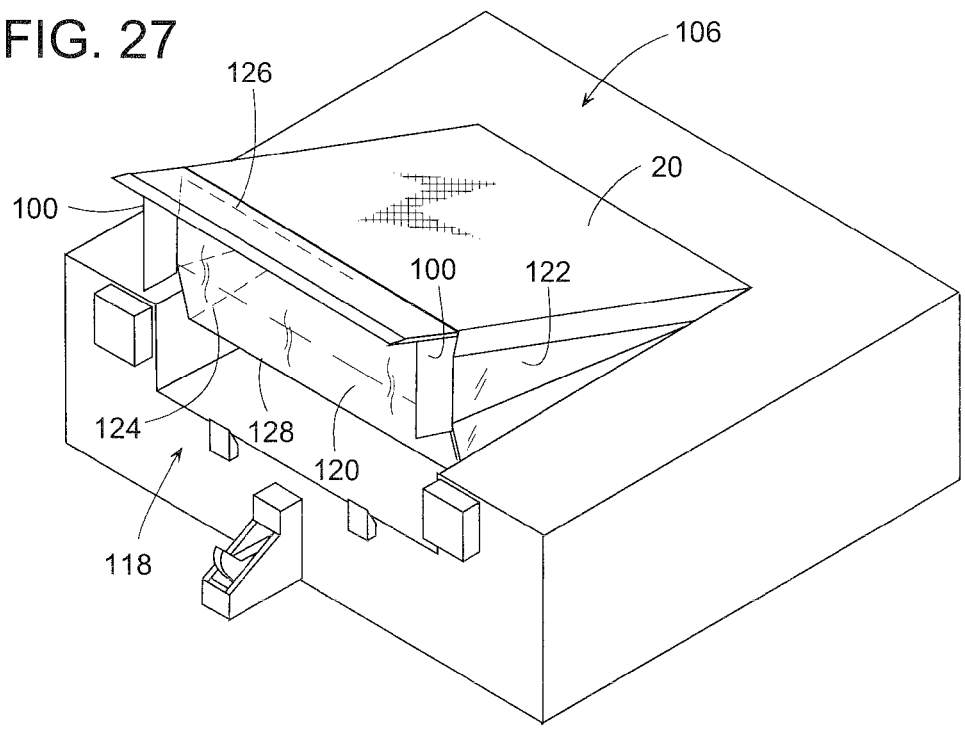
FIG. 27 is a perspective view similar to FIG. 1 but showing another embodiment of a seal system.

Shield system 90 also includes flexible webs 100 that help seal the gap that may otherwise exist between lip 26 and bumper 32. In some installations, web 100 has one edge 102 (FIG. 21) attached to the underside of lip 26 and another edge 104 attached to curtain 92 and/or deck 94. Web 100 is sufficiently flexible to collapse as lip 26 pivots toward deck 94, as shown in FIGS. 19, 20 and 22. FIG. 21 shows how web 100 can deform in reaction to vehicle 30 backing into the dock. Although web 100 is shown installed to dock leveler 98, web 100 could be installed on a wide variety of dock levelers including, but not limited to, all of the dock levelers disclosed in FIGS. 1-28. Moreover, web 100 could be installed on dock levelers that have additional seals other than those disclosed herein or installed on dock levelers that have no additional seals whatsoever. FIG. 27 shows a perspective view of two webs 100 installed on a dock leveler 106.

FIGS. 23-26 show a shield system 108 similar to shield system 90 with FIGS. 23, 24, 25 and 26 corresponding to FIGS. 19, 20, 21 and 22 respectively. With shield system 108, curtain 92 is held taut by one or more leaf springs 110 (e.g., bands of spring steel) instead of being supported by foam blocks 96. Otherwise, shield systems 108 and 90 operate in a similar manner.

Figure 28:
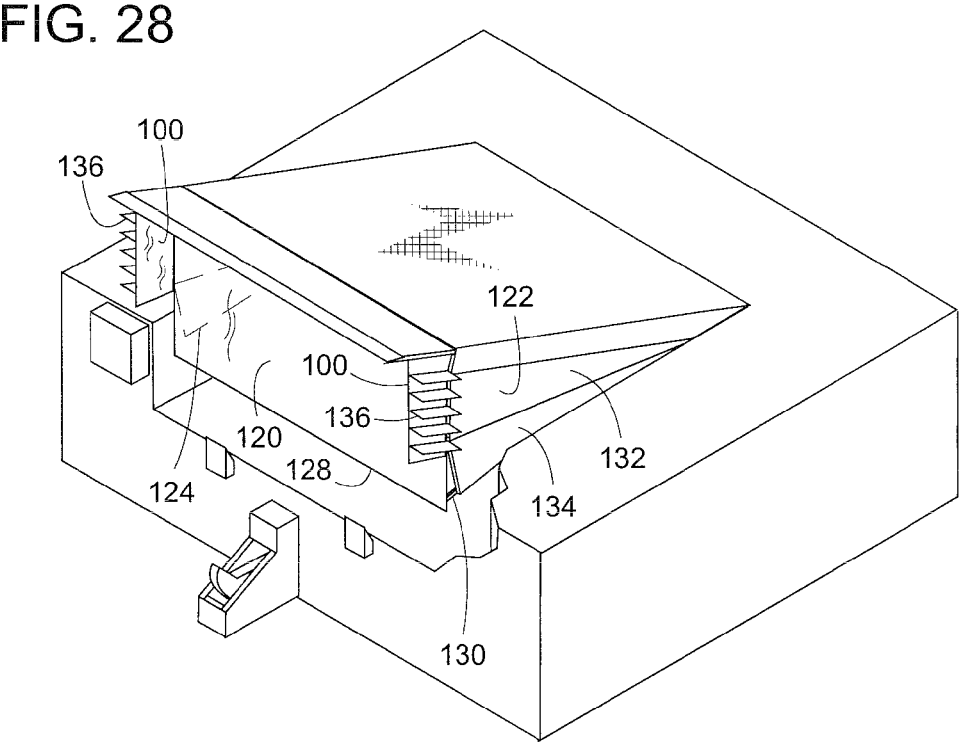
FIG. 28 is a partial cutaway perspective view similar to FIG. 1 but showing another embodiment of a seal system.

FIG. 27 shows a shield system 118 that includes a curtain 120 or flexible shield attached to a right toe guard 122 and a left toe guard 124 of dock leveler 106. Curtain 120 has an upper edge 126 attached to deck 20. A lower edge 128 can be directly attached to toe guards 122 and 124, as shown in FIG. 27, or an extension bracket 130 can couple lower edge 128 of curtain 120 to a lower segment of the toe guards, as shown in FIG. 28. The toe guards help prevent someone from accidentally getting their foot pinched between the deck and the dock as the deck moves down to a cross-traffic position. As the deck descends, the toe guards can collapse, for each toe guard 122 and 124 comprises a plurality of segments 132 and 134 that can move relative to each other. Although their actual structure may vary, some examples of toe guards and how they function are disclosed in U.S. Pat. Nos. 3,456,274; 4,928,340; 4,557,008; and 4,110,860; all of which are specifically incorporated by reference herein.

Referring to FIG. 28, flexible fingers or tabs 136 can be attached to web 100 to improve the sealing between web 100 and bumper 32.

Although the invention is described with respect to various embodiments, modifications thereto will be apparent to those of ordinary skill in the art. The various curtains, for example, are shown as being attached to the pit and separated from the deck or vice versa; however, it is conceivable and well within the scope of the invention to have a split curtain comprising two curtain sections with one section attached to the deck and the other section attached to the pit. With a split curtain design, the two sections would separate as the deck rises and would overlap or come together when the deck returns to its lowered position. Therefore, the scope of the invention is to be determined by reference to the following claims.

What is claimed is:

1. A dock leveler shield system useable at a loading dock, comprising:
    a pivotal deck;
    a lip pivotally coupled to the pivotal deck, wherein the lip has an upper traffic-bearing surface, a rear surface substantially perpendicular to the upper traffic-bearing surface, and a lateral surface that is substantially perpendicular to both the upper traffic-bearing surface and the rear surface; and
    a flexible web attached to the lip and extending below the lip in a substantially parallel relationship with the lateral surface such that the flexible web spans a gap between the pivotal deck and a vehicle parked in the vicinity of the loading dock when the pivotal deck and the lip are in an operational position.

2. The dock leveler shield system of claim 1, wherein the flexible web collapses in response to the lip pivoting toward the pivotal deck.

3. The dock leveler shield system of claim 1, further comprising a pair of bumper structures between which the lip can pivot, wherein the web sealingly engages the pair of bumper structures when the web is positioned therebetween.

4. The dock leveler shield system of claim 1, further comprising a flexible shield attached to the pivotal deck, wherein the flexible web includes one edge attached to the lip and another edge attached to the flexible shield.

5. The dock leveler shield system of claim 1, further comprising a toe guard coupled to the pivotal deck such that the toe guard is substantially perpendicular to the pivotal deck.

\* \* \* \* \*